US009012016B2

(12) United States Patent
Jeanrenaud et al.

(10) Patent No.: US 9,012,016 B2
(45) Date of Patent: Apr. 21, 2015

(54) DECORATED ENAMELLED PART

(75) Inventors: Frederic Jeanrenaud, La Chaux-de-Fonds (CH); Stewes Bourban, Chabrey (CH)

(73) Assignee: Rubattel & Weyermann S.A., La Chaux-de-Fonds (CH)

( * ) Notice: Subject to any disclaimer, the term of this patent is extended or adjusted under 35 U.S.C. 154(b) by 114 days.

(21) Appl. No.: 13/428,666

(22) Filed: Mar. 23, 2012

(65) Prior Publication Data

US 2012/0244326 A1 Sep. 27, 2012

(30) Foreign Application Priority Data

Mar. 23, 2011 (EP) .................................... 11159377

(51) Int. Cl.

| | |
|---|---|
| ***B32B 3/00*** | (2006.01) |
| ***G04D 3/00*** | (2006.01) |
| ***A44C 15/00*** | (2006.01) |
| ***A44C 27/00*** | (2006.01) |
| ***G04B 19/12*** | (2006.01) |
| ***G04B 19/10*** | (2006.01) |

(52) U.S. Cl.

CPC ............ *G04D 3/0048* (2013.01); *A44C 15/004* (2013.01); *A44C 27/007* (2013.01); *G04B 19/12* (2013.01); *G04B 19/10* (2013.01)

(58) Field of Classification Search

CPC .... B41M 5/52; B41M 5/5254; B41M 5/5218; B41M 5/38214; A44C 27/006; A44C 27/007; G04B 19/10; G04B 19/20

USPC ...................................... 428/195.1, 209, 210

See application file for complete search history.

(56) References Cited

U.S. PATENT DOCUMENTS 2,716,829 A * 9/1955 Huguenin et al. .............. 40/615
3,086,880 A * 4/1963 Compton ...................... 428/141
5,972,233 A * 10/1999 Becker et al. .................. 216/28
2006/0062971 A1 3/2006 Bourban et al.
2010/0214882 A1 8/2010 Bourban et al.
2011/0222378 A1 9/2011 Vuille et al.

FOREIGN PATENT DOCUMENTS

EP 1 538 493 A1 6/2005
EP 1 640 822 A1 3/2006
EP 2 365 404 A1 9/2011
FR 2 432 942 3/1980

OTHER PUBLICATIONS

European Search Report issued on Oct. 17, 2011 in corresponding European Application No. 11 15 9377 filed on Mar. 23, 2011 (with an English Translation).

* cited by examiner

*Primary Examiner* — Cathy Lam

(74) *Attorney, Agent, or Firm* — Oblon, McClelland, Maier & Neustadt, L.L.P.

(57) ABSTRACT

The invention relates to an enamelled part (3, 11, 21) for a dial comprising a ceramic substrate (31) coated with a first enamel layer (4', 12, 24, 33) to improve the appearance of said part. According to the invention, the part includes at least one other enamel layer (6', 8', 9, 14, 16, 25, 35, 37, 39, 41, 43, 45) partially covering the first enamel layer (4', 12, 24, 33) so as to form a decoration with a similar improved appearance.

The invention concerns the field of timepieces, jewellery and gems.

10 Claims, 2 Drawing Sheets

Fig. 1
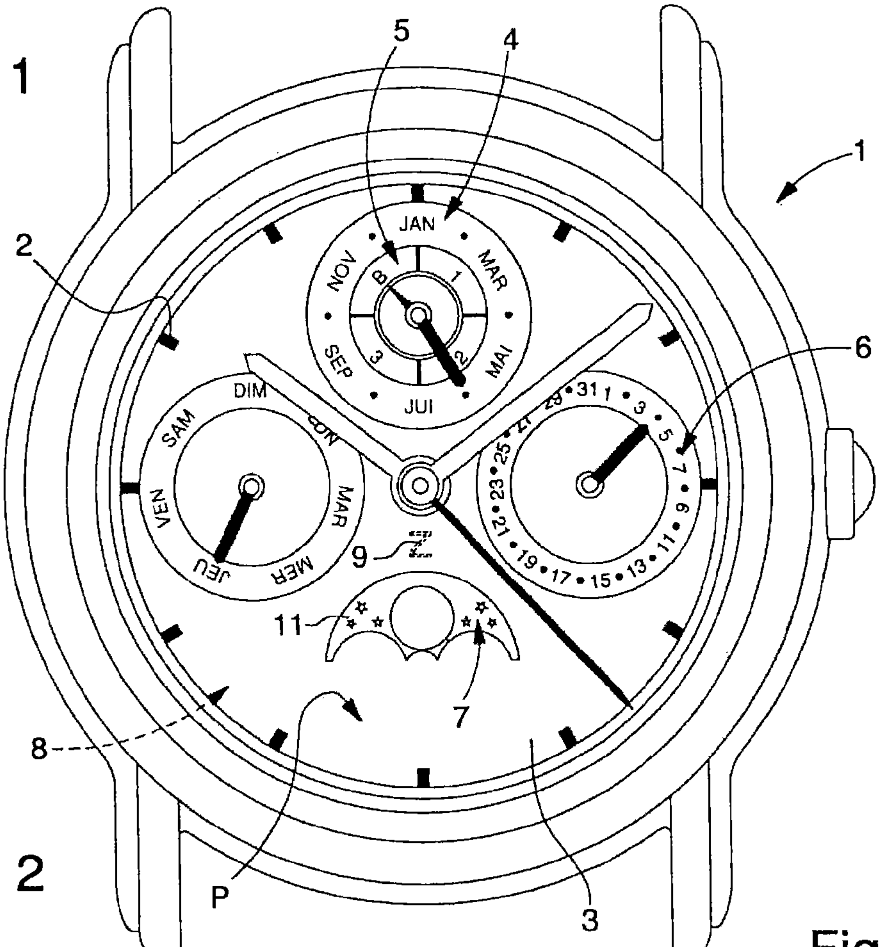
Fig. 2
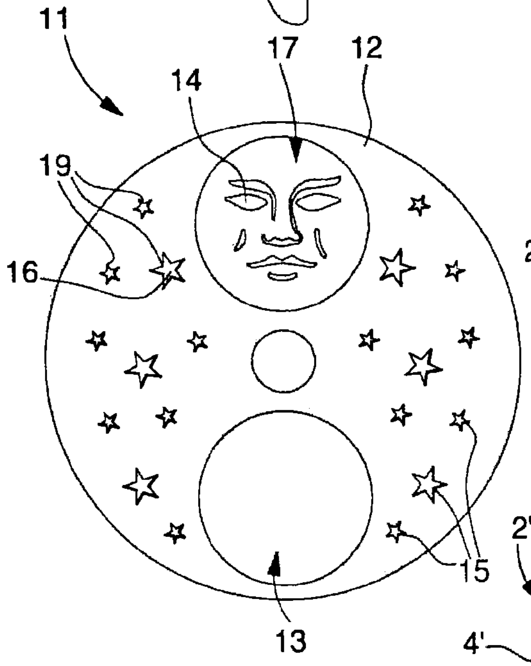
Fig. 3
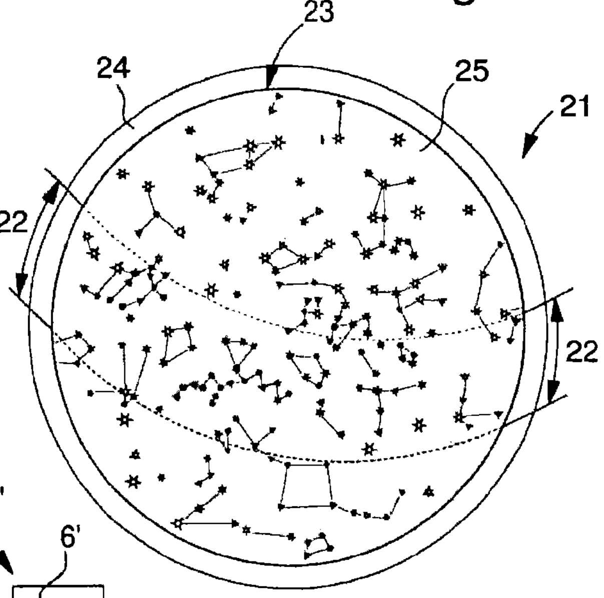
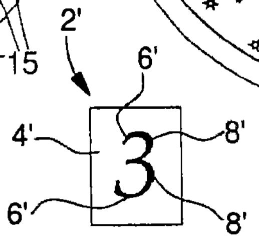
Fig. 4

DECORATED ENAMELLED PART

This application claims priority from European Patent Application No. 11159377.8 filed Mar. 23, 2011, the entire disclosure of which is incorporated herein by reference.

FIELD OF THE INVENTION

The invention relates to an enamelled part for a timepiece or piece of jewellery and, more specifically, a part comprising decorations.

BACKGROUND OF THE INVENTION

It is known from EP Patent No. 1 640 822 to make enamelled dials with a high quality appearance from a ceramic substrate coated with an enamel layer in order to fabricate said dials on a larger scale. However, it is then necessary to form the indexes or graduations with the same high quality appearance. Currently, by way of example, it is not possible to make decorations with the same rendering as the main enamelling of the dial or to offer metallic decorations with such a high quality rendering.

SUMMARY OF THE INVENTION

It is an object of the present invention to overcome all of part of aforecited drawbacks by proposing enamelled parts such as for example for a dial, wherein the metallised or non-metallised decorations have a substantially equivalent rendering to the main enamelling of the part.

The invention therefore relates to an enamelled part for a dial comprising a ceramic substrate coated with a first enamel layer so as to improve the appearance of said part, at least one other enamel layer partially covering the first enamel layer, characterized in that said at least one other enamel layer is at least partially coated with a metallic layer so that said decoration has a homogeneous reflection regardless of the incident light.

It is thus clear that, preferably according to the invention, it is possible to obtain enamelled parts for a dial, i.e. the dial itself or a part fitted to the dial or a similar part to a dial, wherein the metallised or partially metallised decorations offer a homogeneous overall rendering compared to the main enamelling of the part, i.e. high quality.

In accordance with other advantageous features of the invention:

- said at least one other layer is totally covered with a metallic layer;
- said at least one other layer is a different colour and/or a substantially identical colour to the first enamel layer;
- said at least one other layer has a variable thickness so as to offer colour shading;
- said decoration forms at least one alphanumerical symbol and/or a drawing.

Moreover, the invention relates to a method of decorating an enamelled part for a dial including the following steps:

a) providing a ceramic based substrate, the visible part of which is coated with a first enamel layer;

b) selectively forming one other enamel layer on top of the first enamel layer so as to form a decoration on said visible surface.

characterized in that it includes the following step:

e') at least partially coating said one other enamel layer with a metallic layer so that said decoration has a homogeneous reflection regardless of the incident light.

In accordance with other advantageous features of the invention:

- said at least one other layer has a variable thickness so as to offer colour shading;
- step b) includes phase c): selectively printing said decoration on said first enamel layer using a precursor layer of said one other enamel layer and phase d): heating the part so as to transform the precursor into enamel;
- the transformation temperature of said one other enamel layer is at least 100° C. lower than that of the first enamel layer to prevent damaging said first layer in each step b);
- phase c) is achieved by pad printing or silk screen printing;
- said one other layer is a different colour and/or a substantially identical colour to the first enamel layer;
- the method includes the final step e): totally coating said one other enamel layer with a metallic layer so that said decoration has a reflection which is homogeneous regardless of the incident light;
- the method includes the final step e'): partially coating said one other enamel layer with a metallic layer so that said decoration has a reflection which is homogeneous regardless of the incident light and includes a design of the colour of said one other enamel layer.

BRIEF DESCRIPTION OF THE DRAWINGS

Other features and advantages will appear clearly from the following description, given by way of non-limiting illustration, with reference to the annexed drawings, in which:

FIG. 1 is a diagram of a first application variation according to the invention;

FIG. 2 is a diagram of a second application variation according to the invention;

FIG. 3 is a diagram of a third application variation according to the invention;

FIG. 4 is a diagram of a fourth application variation according to the invention;

DETAILED DESCRIPTION OF PREFERRED EMBODIMENTS

Figure 5:
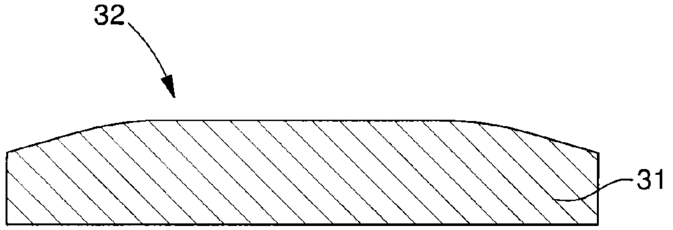
FIGS. 5 to 7 are diagrams of the main steps of the decoration method according to a first embodiment of the invention.

The invention was developed for an enamelled part of a timepiece such as a dial or crown. Naturally, the present invention is not limited to the field of horology. Other applications may also be envisaged such as, in particular, jewellery or gemstones for cuff links, earrings or pendants.

Thus, FIG. 1 shows an example timepiece 1 with a dial 3 comprising most of the fabricating pitfalls likely to be encountered. Dial 3 thus includes a main surface P forming the broadest visible face.

As seen in FIG. 1, dial 3 may include, affixed to surface P, an hour circle 2 and/or a secondary display 4 formed by at least one index and/or at least one alphanumerical symbol.

Dial 3 may also include a secondary display 5 whose visible surface is mounted on a plane above surface P so as to form a raised area. Conversely, dial 3 may also include a secondary display 6 whose visible surface is mounted on a plane underneath surface P so as to form a hollow area. Dial 3 may also include an aperture 7, i.e. an opening in dial 3 revealing part of movement 8 mounted underneath dial 3 such as moon phase 11 in the example in FIG. 1.

The invention advantageously relates to a decorated enamelled part including a single plane P, i.e. having a single surface which may or may not be flat, or comprising several planes. According to the invention, the enamelled part includes a ceramic substrate which is coated with a first enamel layer in order to improve the appearance of said dial. Of course, references to an "enamel layer" herein mean a stack of coatings of the same enamel with a thickness of between 0.1 mm and 0.4 mm thus giving the desired strength of colour.

Advantageously, according to a first embodiment of the invention, the enamelled part includes at least one other enamel layer partially covering the first enamel layer so as to form a decoration with a similar improved appearance to that of the first enamel layer. The term "at least one other enamel layer" means one or several layers. Each layer can cover the first enamel layer and/or another enamel layer as will be explained hereinafter.

Thus, advantageously according to the invention, each at least one other layer may be of a different or a substantially identical colour to the first enamel layer. Indeed, it is sometimes desirable to feature "secret" signatures, i.e. which are difficult to identify at first glance. This is made possible by applying a second enamel layer in the form of a signature 9, as illustrated in FIG. 1, in a substantially identical colour to that of the first enamel. Signature 9 will only be visible by the shadow that it projects in low angled incident light.

Each at least one other layer may also include a layer of different colour. Thus, a first possibility may consist in forming the entire decoration with a layer of a single second enamel which contrasts sharply with the colour of the first enamel. By way of example, a rendering quality close to the first enamel layer is obtained wherein the decoration sharply contrasts with the first enamel layer as seen in FIG. 1 for hour circle 2.

Alternatively to this first possibility, parts of the decoration may include a thicker layer of the second enamel to give the impression of colour shading. Indeed, the parts of the decoration containing a smaller thickness of the second enamel will, by transparency, allow part of the first enamel colour to pass through, giving the impression of an intermediate colour.

By way of example, part 21 of FIG. 3 forms a celestial chart in an enamel layer 25 on top of a first white enamel layer 24. In order to display a variation from light blue to dark blue, an area 22 includes a smaller thickness of the second enamel 25 than the rest of the decoration which goes from the light blue area 22 to the rest of the dark blue decoration, achieved using the same type of enamel layer 25.

A second possibility may consist in forming several layers of different colours to offer a more refined appearance called "shaded". The decoration 2' in FIG. 4 illustrates this second possibility by at least one enamel layer of intermediate colour. This layer is then partially coated with said second enamel layer which contrasts more sharply with the colour of the first enamel. By way of example, it is possible to envisage, for a first white enamel 4', forming in succession an intermediate grey enamel layer 6' for the entire decoration 2' and a final black enamel layer 8' on the widest parts of decoration 2'.

According to a second embodiment of the invention, said at least one other layer is, advantageously, totally or partially coated with a metallic layer so that said decoration has a homogeneous reflection regardless of the incident light.

Indeed, if a metallic layer is directly formed on an enamelled part, it does not reflect the light and thus only reflects its colour in a single incidence, and thus has the drawback of an enamelled part with a high quality rendering but metallic parts which are dark except in a particular incident light.

Advantageously according to the second embodiment of the invention, after the thickness has been set according to the first embodiment, a metallic layer is formed on top. Indeed, setting the thickness makes the decoration substantially convex and, once coated with a metal layer, part of the colour thereof will be reflected regardless of the incident light. A metallic rendering of the same high quality as the first enamel is thus obtained.

Thus, according to a first alternative of the second embodiment, the metallic layer coats all of the second enamel layer so as to present a totally metallic decoration such as an hour circle 2 of FIG. 1 or the constellations 23 of FIG. 3. Of course it is thus possible to form either entirely coated surfaces, such as the moon 13 of FIG. 2, or only coated contours such as the stars 15 of FIG. 2, the centre of which is empty and reveals the first enamel layer 12.

According to a second alternative of the second embodiment, the metallic layer partially covers the second enamel layer so as to present a decoration comprising a metallic portion and an enamelled portion other than the first enamel layer, such as the moon 17 of FIG. 2, the face of which is formed by apertures in the metallic layer to reveal the second enamel layer 14. Of course, it is also possible to form coated contours, such as the stars 19 of FIG. 2, the centre of which is empty to reveal the second enamel layer 16.

It is thus clear that, preferably according to the invention, it is possible to obtain enamelled parts for a dial, i.e. the dial itself or a part fitted to the dial or a part similar to a dial, wherein the decorations, which may or may not be metallised, offer a homogeneous overall rendering compared to the main enamelling of the part, i.e. high quality.

Figure 6:
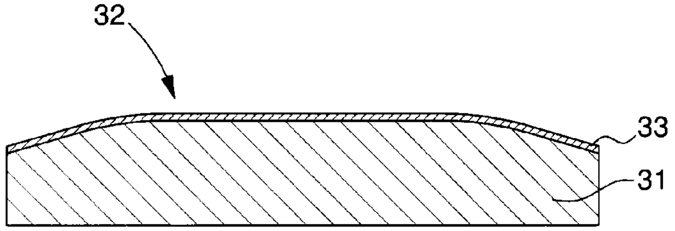

The fabrication of the enamelled part according to the invention will be better understood with reference to FIGS. 5 to 8. The method according to the invention relates to the decoration of an enamelled part for a dial, i.e. suitable for a dial. According to a first step a) of a first embodiment, the method consists in forming a ceramic substrate 31 of which the visible portion 32 is coated with a first enamel layer 33. As seen in FIGS. 5 and 6, the visible surface 32 is not necessarily flat and may also comprise top and/or bottom planes (not shown) as explained herein before.

Figure 7:
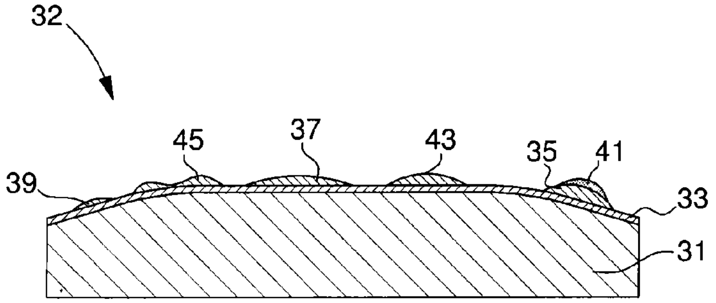
Figure 8:
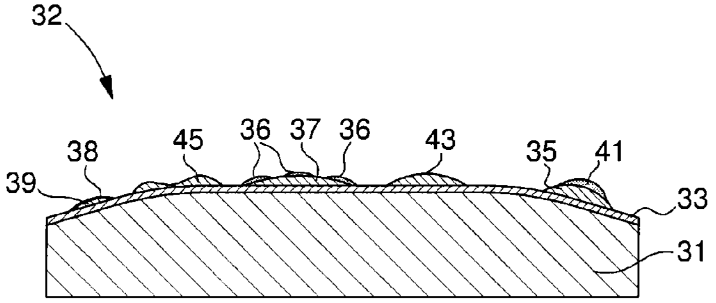
FIG. 8 is a diagram of an optional final step of the decoration method according to a second embodiment of the invention.

According to the invention, the method continues with one or several step(s) b) consisting in selectively forming another enamel layer 35, 37, 39, 41, 43, 45 on top of the first enamel layer 33 to form a decoration on said visible surface 32, as illustrated in FIG. 7. Thus, the number of steps b) depends, as explained hereinbefore, on whether it is desired to make a decoration with a single enamel layer with 45 or without 43 different thicknesses, such as for example the "secret" signature 9 of FIG. 1, or the background 25 of the celestial chart in FIG. 3, if it is desired to make several decorations with a single enamel layer 39 with or without different thicknesses such as the hour circle 2 of FIG. 2, if it is desired to make a decoration with several different enamel layers 35, 41, with or without different thicknesses, such as decoration 2' of FIG. 4, or if it is desired to make several decorations with several enamel layers 37, 38, 41, 43, 45, which may or may not be different or have different thicknesses, such as the part 11 used for displaying moon phases.

Preferably according to the invention, each step b) includes a first phase c) consisting in selectively printing the decoration 35, 37, 39, 43, 45 on said first enamel layer 33, or the decoration 41 on another enamel layer 35, using a precursor solution of the future enamel layer, then a second phase d) consisting in heating the part so as to transform the precursor solution into enamel. According to the invention, the precursor solution is formed of particles, comprising enamel powder and pigments for the future colouring, which are suspended in a solvent such as oil.

Moreover, the transformation temperature of phase d) of each additional enamel layer 37, 39, 41, 43, 45 is preferably at least 100° C. lower than that of the first enamel layer 33 to prevent damaging the first enamel layer 33 existing in each step b). To achieve this, it is possible, for example, to use "low fire" enamels for decorations 35, 37, 39, 41, 43, 45 and "high fire" enamels for the first layer 33. By way of example, the "low fire" enamel may for example react and vitrify around 600° C. and the "high fire" enamel around 1,000° C. This temperature difference, which is much greater than 100° C., is chosen so that, during the firing of the "low fire" enamel, the "high fire" enamel structure is not affected or barely affected.

It is thus clear that, depending on the number of additional layers of enamels 37, 39, 41, 43, 45 to be added to the first layer 33, it is preferable to choose the characteristic temperatures of each of the enamels or to perform each consecutive step b) from the highest transformation temperature to the lowest. This will therefore prevent the enamel layers from being weakened and/or damaged. By way of example, it is preferable to use an enamel 41 which vitrifies at a lower temperature than the enamel 35, which in turn vitrifies at a lower temperature than the first enamel 33.

To allow sufficiently precise printing, phase c) is preferably achieved by pad printing or silk screen printing in order to sharply deposit layers 35, 37, 39, 41, 43, 45, which may or may not be of different colour to the first enamel layer 33, with the maximum contrast.

According to the second embodiment, after steps a) and at least one step b) of the first embodiment, the method includes a final step e) consisting in totally covering said one other enamel layer 39 with a metallic layer 38 to form, for example, moon 13, stars 15 or constellations 23 or e') consisting in only partially coating said one other enamel layer 37 with a metallic layer 36 to form the moon 17 with the pierced face 14 or stars 19 with empty centres 16.

Preferably according to the invention, step e) or e') includes a first phase f) consisting in coating the decoration or only one portion thereof using a colloidal type solution formed by a solvent and metallic powder in suspension, then a second phase g) consisting in heating the part to evaporate the solvent and form a homogeneous metallic layer. According to the invention, the metallic powder may be based on a precious metal like gold or platinum.

Of course, this invention is not limited to the illustrated example but is capable of various variants and alterations that will appear to those skilled in the art. In particular, it is clear that the shapes and dimensions of the decorations may be totally different without this complicating the fabrication method.

Moreover, as explained hereinbefore, application of the invention is not limited to the field of horology but also applies to the decoration of any enamelled part suitable for a dial, such as, in a non-limiting manner, a decorative disc fitted into a cuff link, an earring or pendant.

Finally, it is evident that a last layer may be deposited by ordinary pad printing. By way of example, if a step e) has be performed instead of a step e'), this last ordinary pad printing step could be used, for example, to draw a face on moon 13.

What is claimed is:

1. An enamelled part for a dial with a metallised decoration, comprising:

a ceramic substrate coated with a first enamel layer to improve the appearance of the enamelled part; and at least one other enamel layer partially covering the first enamel layer, wherein the at least one other enamel layer forms a substantially convex curved surface, and wherein the at least one other enamel layer is at least partially coated with a metallic layer so as to form a substantially convex metallised decoration with a homogeneous reflection regardless of the incident light.

2. The part according to claim 1, wherein the at least one other enamel layer is totally coated with the metallic layer.

3. The part according to claim 1, wherein the at least one other enamel layer is of a different colour from the first enamel layer.

4. The part according to claim 1, wherein the at least one other enamel layer is of substantially identical colour to the first enamel layer.

5. The part according to claim 1, wherein the at least one other enamel layer has a variable thickness in order to offer colour shading.

6. The part according to claim 1, wherein the metallised decoration forms at least one alphanumerical symbol.

7. The part according to claim 1, wherein the metallised decoration forms at least one drawing.

8. A timepiece including at least one enamelled part according to claim 1.

9. The part according to claim 1, wherein the first enamel layer has a thickness of between 0.1 mm and 0.4 mm.

10. The part according to claim 1, wherein the at least one other enamel layer has a thickness of between 0.1 mm and 0.4 mm.

* * * * *